Dec. 18, 1951     E. V. T. JAHRL     2,579,449
INSTRUMENT FOR THE ADJUSTMENT AND MEASURING
OF ANGLES IN MACHINE TOOLS
Filed April 5, 1947

INVENTOR
ERIC VILHELM TORSTEN JAHRL
BY Otto Munk
HIS ATTY

Patented Dec. 18, 1951

2,579,449

UNITED STATES PATENT OFFICE 2,579,449

INSTRUMENT FOR THE ADJUSTMENT AND MEASURING OF ANGLES IN MACHINE TOOLS

Eric Vilhelm Torsten Jahrl, Orebro, Sweden

Application April 5, 1947, Serial No. 739,532
In Sweden March 26, 1945

1 Claim. (Cl. 33—174)

Hitherto, so-called sine-bars have been used for the adjustment of angles in machine tools, said sine-bars being constituted by rulers having cylindrical parallel members secured to each end thereof, which members are placed on a plane surface, gauge-pieces being applied underneath one of said members, so as to cause the bar or ruler to assume the desired angle relatively to said surface. Said known device consequently is not so useful as is desirable for the adjustment of angles in machine tools, for instance for the adjustment of cone angles of work pieces.

The present invention refers to an improved instrument for the adjustment and measuring of angles in machine tools, such as circular grinding machines, tool grinding machines, lathes, milling machines and the like, in which a sine-bar is pivotally attached to a block, relatively to which the sine-bar is adjustable, for instance by means of gauge-pieces, and the invention is principally distinguished by the feature that the block is provided with members such as center apertures or one or more studs adapted to be clamped onto the spindle or between center pins of the machine tool.

The accompanying drawing illustrates the invention by way of example.

Figure 1:
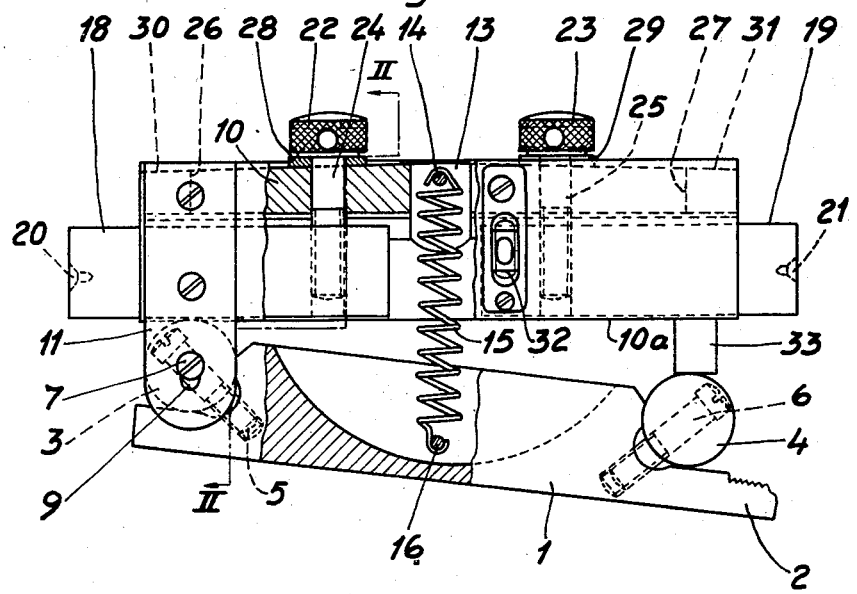
Figure 2:
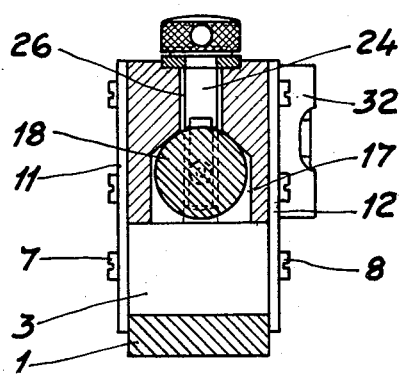

Fig. 1 shows the instrument in elevation and partly in longitudinal section, and Fig. 2 shows a cross section on line II—II in Fig. 1.

In the drawing, 1 designates a sine-bar having a grooved handle 2 and two cylindrical rollers 3, 4, which are secured thereto by means of screws 5, 6. The roller 3 is provided with journals 7, 8 projecting through elongated apertures 9 in bearing rails 11, 12 secured to the block 10 at each end of the roller. A tension spring 15 is secured by means of a pin 14 in a bore 13 provided in the block, the other end of said spring being attached in the sine-bar 1 by means of a pin 16. As will appear from Fig. 2, the block has a through-slot 17 milled into the same, which slot has a V-shaped bottom portion and is parallel with the measuring plane of the block. Displaceable cylindrical studs 18 and 19 respectively are arranged at each end of the slot 17, said studs projecting from the block and being provided at the outer ends thereof with center apertures 20 and 21 respectively adapted to receive the center pins of a machine tool. Furthermore, the studs 18, 19 have screws 24, 25 threaded into the same, said screws being provided with heads 22, 23 and extending through longitudinal slits 26, 27 in the block, so that the studs may be secured in the desired axial position in the block by tightening the screws 24, 25, and be displaced upon loosening of said screws. In order that the studs shall be seated firmly so as to be prevented from being thrust into the block, after the screws have been tightened up, and in order to render an exaggerated tightening of the screws unnecessary, the heads 22, 23 bear on slightly outwardly and downwardly inclining surfaces 30, 31 milled in the block, through the intermediary of slightly wedge-shaped washers 28, 29. As will be readily understood, the studs are thus effectively prevented from sliding into the slot, after the screws have been tightened up, while the screws require to be loosened only very slightly to permit a convenient outward displacement of the studs. Furthermore, the block has a water-gauge 32 secured thereto.

The device may be used, for instance, to secure a definitely determined cone angle in the turning of a conical part. To this end, the gauge-piece 33 corresponding to the desired cone angle according to existing tables is inserted between the roller 4 and the measuring plane 10a. The other roller 3 of the sine-bar is constantly pressed against the measuring plane, by means of the spring 15.

The studs 18, 19 are now to be adjusted in accordance with the length of the work-piece, and the instrument is inserted into the lathe, so that the center pins of the latter are introduced into the center apertures 20, 21. After that, the support of the lathe is turned so that a meter applied to the sine-bar does not make any deflection when displaced. In the following turning operation, the cutting tool, which is displaceable on the support in the same manner, will thus be displaced at the same angle as the meter relatively to the work-piece, whereby the desired cone angle is obtained.

In order to enable the instrument to be used in the treatment of work-pieces of greatly varying lengths, studs of different lengths may be introduced into the instrument.

Having now described my invention, what I claim as new and desire to secure by Letters Patent is:

An instrument for the adjustment and measuring of angles comprising, in combination, a block, a sine-bar pivotally attached to said block, two bores arranged in alignment in said block substantially at right angles to the pivot of said sine-bar, two studs displaceably arranged, respectively, in said bores, and means for locking said studs in said bores, said studs being provided at the ends thereof projecting from said bores with center apertures adapted to receive the center pins of a machine tool.

ERIC VILHELM TORSTEN JAHRL.

REFERENCES CITED

The following references are of record in the file of this patent:

UNITED STATES PATENTS

| Number | Name | Date |
|---|---|---|
| 394,462 | Cook | Dec. 11, 1888 |
| 777,215 | Meston | Dec. 13, 1907 |
| 2,397,300 | Tilton | Mar. 26, 1946 |
| 2,398,121 | Silvermaster | Apr. 9, 1946 |
| 2,429,517 | Knapp | Oct. 21, 1947 |

FOREIGN PATENTS

| Number | Country | Date |
|---|---|---|
| 20,853 | | |
| 20,853A | England | 1906 |
| 341,773 | Germany | Oct. 7, 1921 |